US012741847B2

(12) United States Patent
Talonen et al.

(10) Patent No.: US 12,741,847 B2
(45) Date of Patent: Sep. 22, 2026

(54) ROPE TERMINAL, ELEVATOR AND METHOD FOR INSTALLING ELEVATOR SUSPENSION ROPE

(71) Applicant: Kone Corporation, Helsinki (FI)

(72) Inventors: Tapani Talonen, Helsinki (FI); Ville Myyryläinen, Helsinki (FI); Petteri Dammert, Helsinki (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 19/044,873

(22) Filed: Feb. 4, 2025

(65) Prior Publication Data

US 2025/0178867 A1 Jun. 5, 2025

Related U.S. Application Data

(63) Continuation of application No. PCT/EP2022/074306, filed on Sep. 1, 2022.

(51) Int. Cl.
*B66B 7/08* (2006.01)
*B66B 19/02* (2006.01)

(52) U.S. Cl.
CPC .............. *B66B 7/085* (2013.01); *B66B 19/02* (2013.01)

(58) Field of Classification Search
CPC ....... B66B 7/1223; B66B 7/1215; B66B 7/08; B66B 7/085; B66B 19/02
See application file for complete search history.

(56) References Cited

U.S. PATENT DOCUMENTS 5,199,137 A * 4/1993 Edwards ............... F16G 11/046 29/517
9,828,216 B2 * 11/2017 Berben ................ G01N 27/041

FOREIGN PATENT DOCUMENTS

CN 210214482 U * 3/2020 .............. F16G 11/04
ES 2230916 T3 * 5/2005 ............. B66B 7/062
WO 2005/095251 A1 10/2005
WO WO-2015043146 A1 * 4/2015 ............... B66B 7/10
WO WO-2020084701 A1 * 4/2020 ............... B66B 7/06
WO 2022/053481 A1 3/2022

OTHER PUBLICATIONS

International Search Report for International Application No. PCT/EP2022/074306 dated Apr. 25, 2023.

* cited by examiner

*Primary Examiner* — Diem M Tran
(74) *Attorney, Agent, or Firm* — Harness, Dickey & Pierce, P.L.C.

(57) ABSTRACT

A rope terminal for supporting an elevator suspension rope includes a body of electrically conductive material, including a wedge house; a connecting rod of electrically conductive material, fixed to the body for connecting mechanically the rope terminal to a rope terminal fixing in a machine room or in a shaft; and a wedge insertable in the wedge house when the rope is wound around the wedge. The rope terminal includes at least one grounding member that creates an electrically conductive connection between the body of the rope terminal and an electrically conductive core of the rope having an electrically insulating coating. The rope terminal is used in an elevator and a method for installing an elevator suspension rope having an electrically insulating coating.

13 Claims, 3 Drawing Sheets

ROPE TERMINAL, ELEVATOR AND METHOD FOR INSTALLING ELEVATOR SUSPENSION ROPE

CROSS-REFERENCE TO RELATED APPLICATION

This application is a continuation of PCT International Application No. PCT/EP2022/074306 which has an International filing date of Sep. 1, 2022, the entire contents of which are incorporated herein by reference.

FIELD OF THE INVENTION

The invention relates to coated elevator suspension ropes. The elevator is preferably an elevator for transporting passengers and/or goods.

BACKGROUND OF THE INVENTION

An elevator may comprise a car, a shaft, hoisting machinery, suspension ropes, and a counterweight. A separate or an integrated car frame may surround the car.

The hoisting machinery may be positioned in a shaft. The hoisting machinery may comprise a drive, an electric motor, a traction sheave, and a machinery brake. The hoisting machinery may move the car upwards and downwards in the shaft and stops the car on level. The machinery brake may keep the car on level by holding the rotation of the traction sheave and thereby the movement of the elevator car. Machinery brakes may also stop the car in special conditions like unintended car movement by machine or emergency stop for example in electricity break.

The car frame may be connected by the suspension ropes via the traction sheave to the counterweight. The car frame may further be supported with guide members at guide rails extending in the vertical direction in the shaft. The guide rails may be attached with fastening brackets to the side wall structures in the shaft. The guide members ensure the vertical movement of the car when the car moves upwards and downwards in the shaft. The counterweight may be supported in a corresponding way on guide rails that are attached to the wall structure of the shaft.

The car may transport people and/or goods between the landings in the building. The wall structure of the shaft may be formed of solid walls or of an open beam structure or of any combination of these.

In hoisting and suspension technology based on coated ropes typically cores made from steel cords are coated by a polyurethane coating, for example. Coating in ropes is providing several big benefits. As there is not direct steel to steel contact with traction sheave it enables to use higher tension cords with longer lay lengths, which enables to use less and thinner ropes, and resulting in a reduced moving mass and enabling a smaller traction sheave. Also, the coating is providing higher friction level, which allows reduction in moving masses such as the car and the counterweight.

One problem related with coated ropes is rope bundling together in the shaft. This problem is worse, the longer the travel. Then ropes are not going in order to pulley grooves, and there comes also fleet angle. Also there is risk of rope and coating damage, as the rope bundling is reducing clearances for example to guide rail brackets. Due to insulative polyurethane coating, the suspension ropes are floating without any electrical grounding to electrical earth. Coating is insulating the ropes from traction sheave and pulleys as well as from rope wedge house fixings in rope terminals. This impacts that ropes charge electrically due to static electricity.

There is a demand for reliable and simple coated rope grounding.

SUMMARY OF THE INVENTION

An object of the present invention is to introduce an improved rope terminal for elevator suspension ropes having an electrically insulating coating, a method for installing a coated elevator suspension rope, and an elevator. The invention provides solutions relating to problems associated with coated rope static electricity problems described above and hereinafter.

The rope terminal according to the invention is defined in independent claim 1.

The elevator according to the invention is defined in claim 11.

The method for installing an elevator suspension rope according to the invention is defined in independent claim 12.

It has been found that a solution for the rope bundling effect is proper suspension rope grounding to electrical earth. Test rides have shown that after grounding ropes, the bundling effect has been eliminated.

The invention provides solutions to ground ropes without additional components and additional installation times. The invention provides solutions to attach ropes to rope terminals without separate grounding arrangements. The invention provides solutions without rope coating peeling and clamping the peeled rope wire with an earthing clamp and a wire clamp to earth.

Proper grounding eliminates static electricity, which reduces rope contamination because small particles, such as dust like carbon and especially steel dust, do not attach to the surface of the rope. In addition, the service life of the rope coating is extended, and the invention has a positive effect on the frictional contact of the rope on the traction sheave. It is also visually pleasing when the rope surfaces remain clean.

Some embodiments provide solutions to ground ropes that are coated by an elastomer coating such as polyurethane or rubber.

Some embodiments provide solutions to ground ropes that are coated by an electrically non-conducting coating or a coating that collects static electricity.

Some embodiments provide solutions to enhance elevators for potentially explosive atmospheres in which sparks are not permitted. Avoiding static electricity prevents the formation of sparks in potentially explosive atmospheres and thus the risk of ignition of an explosive atmosphere.

The invention will enable wider use of coated ropes and will provide opportunity to improve eco-efficiency by reducing energy consumption and sustainability by reducing $CO_2$ footprint through reduced material use. In addition, coated ropes improve the efficiency of the elevator space and reduce cost of the elevator due to smaller machine and reduced material.

BRIEF DESCRIPTION OF THE DRAWINGS

The invention will in the following be described in greater detail by means of preferred embodiments with reference to the attached drawings, in which.

DETAILED DESCRIPTION

Figure 1:
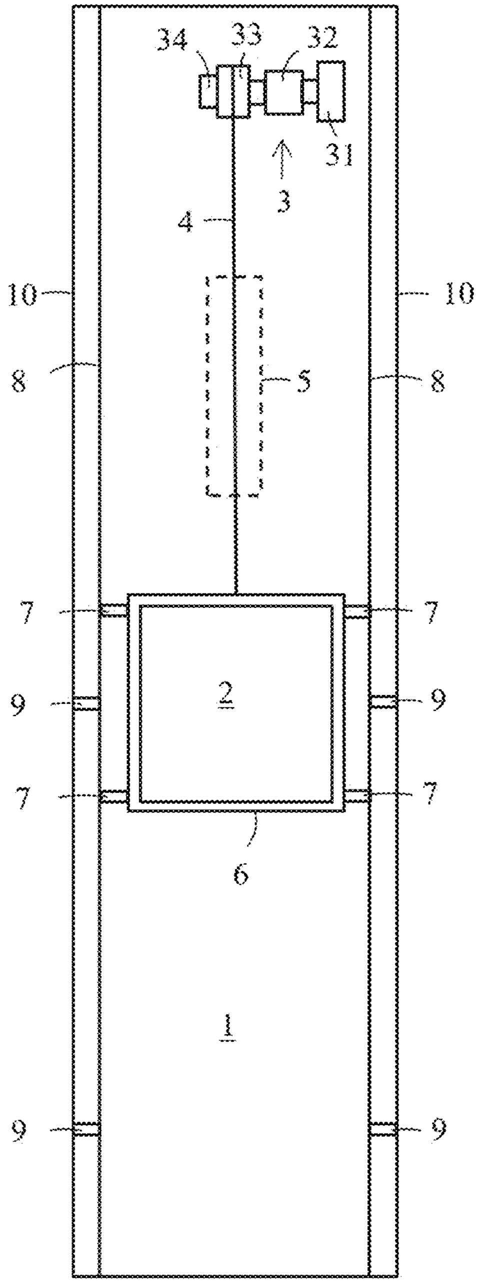
FIG. 1 shows a side view of an elevator.

In the present figures, the rope terminal and the elevator are not shown to scale, but the figures are schematic, illustrating the basic structure and operation of the preferred embodiments. In this case, the components indicated by reference numerals in the accompanying figures correspond to the components indicated by reference numerals in this description.

FIG. 1 shows the elevator with a car 2, a shaft 1, a hoisting machinery 3, suspension ropes 4, and a counterweight 5. A separate or an integrated car frame 6 also called as a sling may surround the car. The hoisting machinery 3 may be positioned in the shaft 1. The hoisting machinery may comprise a drive 31, an electric motor 32, a traction sheave 33, and a machine brake 34. The hoisting machinery may move the car upwards and downwards in the shaft. The machine brake 34 may stop the rotation of the traction sheave 33 and thereby the movement of the elevator car 2.

The car 2 is connected by the ropes 4 via the traction sheave 33 and one or more diverting pulleys (not shown in the Figure) to the counterweight 5.

The car and the counterweight are suspended by one or more ropes 4 which are guided over the traction sheave 33 for moving the car 2 vertically in the shaft 1.

The car 2 is further supported with guide members 7 at guide rails 8 extending in the vertical direction in the shaft. The guide rails may be attached with fastening brackets 9 to the side wall structures 10 in the shaft. The guide members 7 ensure the vertical movement of the car 2 when the car moves upwards and downwards in the shaft 1. The counterweight 5 may be supported in a corresponding way on guide rails that are attached to the wall structure of the shaft.

Figure 2:
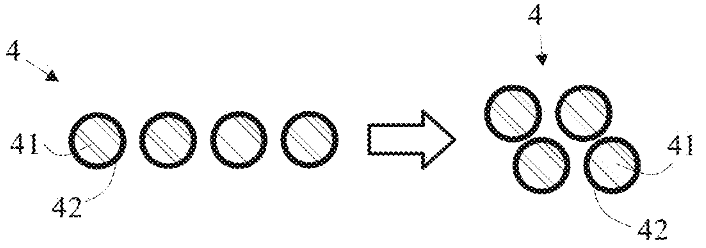
FIG. 2 shows a coated rope bundling effect.

FIG. 2 illustrates a coated rope bundling effect. Firstly, four coated ropes 4 are shown side by side, like ropes 4 entering or leaving a rope pulley, for example the traction wheel 33. The ropes 4 comprise a core 41 and a coating 42. Secondly, the four coated ropes 4 without grounding to earth are bundled together in a shaft, and the ropes may enter pulley grooves in wrong order. This problem is worse, the longer the travel. Rope bundling increases fleet angle, i.e. the ropes do not go straight into the pulley grooves. When the ropes do not go straight into the pulley grooves, the life of the ropes is reduced, and the fleet angle also increases rope twisting. Also there is risk of rope and coating damage, as the rope bundling is reducing clearances for example to guide rail brackets. Due to insulating polyurethane coating, the suspension ropes are floating without any electrical grounding to electrical earth. Coating is insulating the ropes from the traction sheave and the pulleys as well as from rope wedge house fixings in rope terminals. This impacts that ropes charge electrically due to static electricity.

FIGS. 3 to 7 show embodiments to ground the coated rope 4 to earth with a rope terminal equipped with at least one grounding member 26; 56 configured to create an electrically conductive connection between a body 21; 51 of the rope terminal 20; 50 and the electrically conductive core 41 of the rope 4, without need to peel an electrically insulating coated rope or to install additional grounding terminal. Preferably the at least one grounding member is integrated in the body of the rope terminal. According to an embodiment there is provided an electrically conductive connection between the rope terminal 20; 50 and a rope terminal fixing (not shown in the figures).

Figure 3:
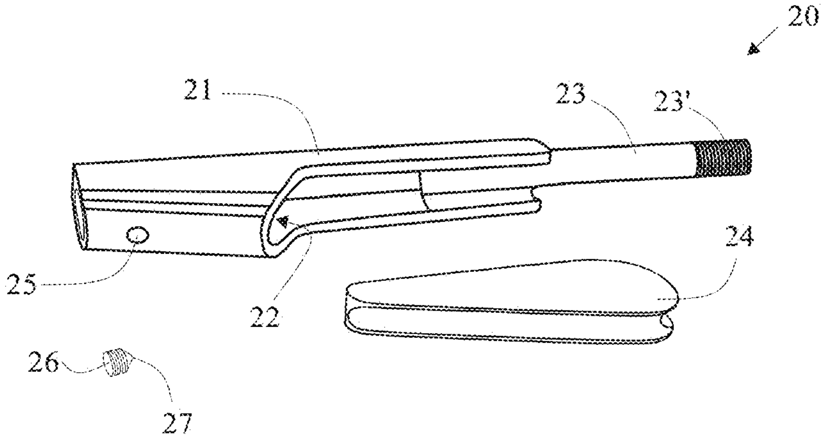
FIG. 3 shows a first embodiment of a rope terminal with a first grounding member.

FIG. 3 shows a first rope terminal 20. The rope terminal 20 comprises a first body 21 of electrically conductive material with a wedge house 22, and a wedge 24. The rope terminal 20 comprises a connecting rod 23 of electrically conductive material equipped with e.g. threads 23' and fixed to the body 21 for connecting mechanically the rope terminal to a rope terminal fixing (not shown in the figures) in a machine room or in the shaft. The first rope terminal 20 is creating an electrical grounding connection for the coated rope 4 as described hereinafter.

According to an embodiment there is provided an electrically conductive connection between the rope terminal 20; 50 and the rope terminal fixing. For example, the connecting rod 23, 53 must not be insulated e.g. by a plastic or rubber sleeve from the rope terminal fixing, which is then connected to electrical earth e.g. to a guide rail.

The rope terminal 20 comprises means for generating electrical grounding connection to the electrically insulating coated rope 4 without peeling the rope. The rope terminal 20 comprises at least one first grounding member 26 configured to create an electrical connection between the body 21 and the core 41 of the rope 4. The at least one first grounding member 26 comprises an electrically conductive sharp or perforating/penetrating command 27 configured to create an electrical connection between the body 21 and the core 41 of the rope 4.

According to a first example of the first embodiment, the body 21 comprises at least one opening 25 for receiving at least one first grounding member 26 with an electrically conductive sharp or perforating command 27. Preferably the at least one opening 25 is a threaded hole, and the at least one first grounding member 26 with an electrically conductive sharp or perforating command 27 is an electrically conductive screw component with a sharp or perforating command. The thread-type first grounding member 26 enables a controlled depth adjustment of the perforating command, and also easy releasing of the rope 4 from the wedge housing 22. The first grounding member 26 may be a retaining screw type component.

According to a second example of the first embodiment, another means for generating electrical grounding connection to the rope 4 without peeling the rope comprises at least one second conductive grounding member such as a sharp shape or tip (not shown in the figures) formed inside the body 21, said at least one sharp shape or tip, preferably in the inner wall of the wedge house, configured to perforate/penetrate the rope 4 coating 42 when the rope is wound around the wedge 24 and the wedge is inserted into the wedge house 22.

The at least one first conductive grounding member 26 and the at least one second conductive grounding member is capable of penetrating the coating 42 of the rope 4 and establishing electrical contact between the cords of the rope core 41 and the body 21 of the rope terminal 20.

Preferably the grounding implemented according to the first and second examples of the first embodiment is on free end side 4' of the rope 4 and the wedge 24 and wedge house 22. So not in suspension side for eliminating any critical damage in suspension cords.

According to an embodiment the solutions according to the first and second examples of the first embodiment may be implemented in the same rope terminal.

According to an embodiment the solutions according to the first and second examples of the first embodiment may be implemented in the same rope terminal as the solutions according to the second embodiment.

Figure 4:
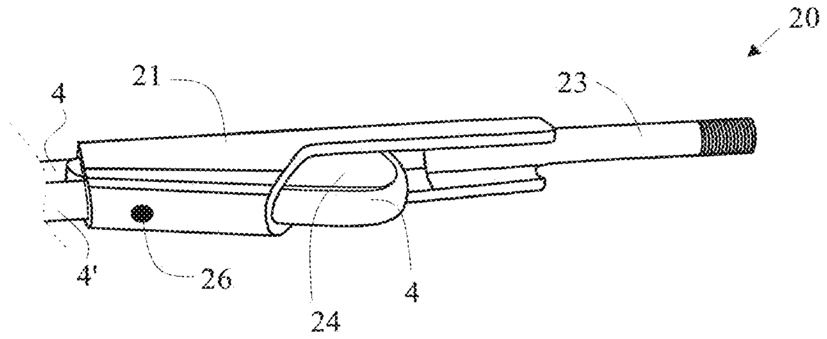
FIG. 4 shows a first example of the first embodiment with an assembled suspension rope.

FIG. 4 shows the rope terminal 20 according to the first example of the first embodiment with an assembled suspension rope 4 between the wedge house 22 and the wedge 24. The thread-type first grounding member 26 is tightened against the rope forming electrically conductive connection between the body 21 and the core 41 of the rope 4 without need to peel coated rope or to install additional grounding terminal.

Figure 5:
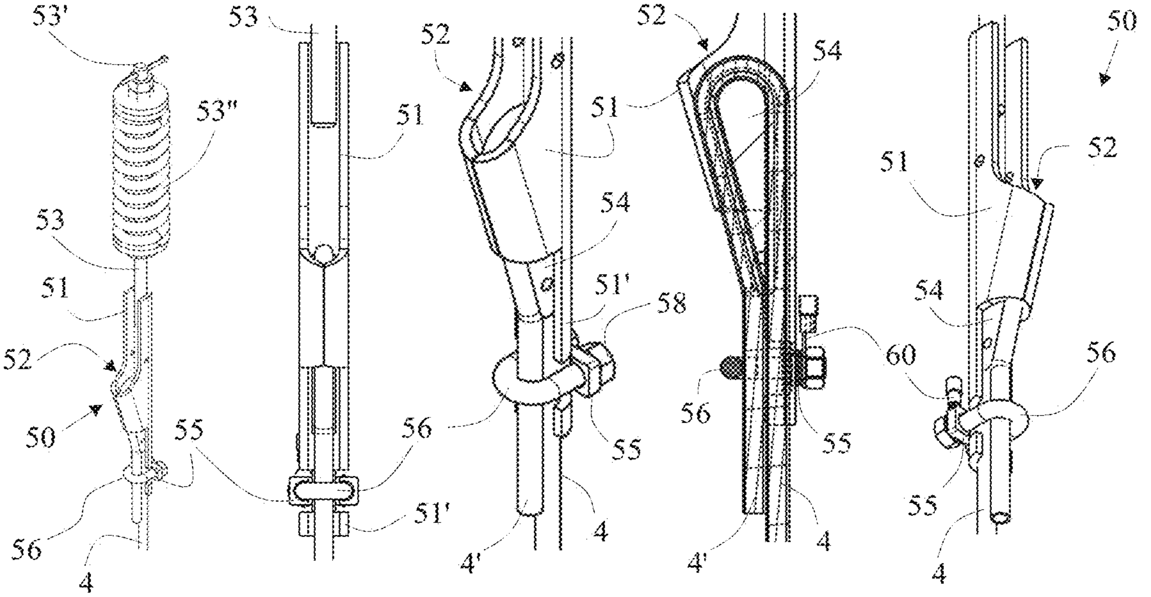
FIG. 5 shows a second embodiment of a rope terminal with a second grounding member.

FIG. 5 shows a second rope terminal 50. The rope terminal 50 comprises a second body 51 of electrically conductive material with a wedge house 52, and a wedge 54. The rope terminal 50 comprises a connecting rod 53 of electrically conductive material equipped with e.g. threads 53' and fixed to the body 51 for connecting mechanically the rope terminal with help of a spring 53" to a rope terminal fixing (not shown in the figures) in a machine room or in the shaft. The second rope terminal 50 is creating an electrical grounding connection for the coated rope 4 as described hereinafter.

The second rope terminal 50 comprises means for generating electrical grounding connection to the coated rope 4 without peeling the rope. The rope terminal 50 comprises at least one third grounding member 56, 55. The least one third grounding member 56 comprises an electrically conductive sharp or perforating/penetrating command 57 configured to create an electrically conductive connection between the body 51 and the core 41 of the rope 4.

The second rope terminal 50 comprises at least one third grounding member 56 with an electrically conductive sharp or perforating command 57, and the second body 51 comprises at least one opening for receiving the at least one third grounding member 56.

According to a first example of the second embodiment, the second body 51 comprises at least one integrated rope clip counterpart 55 with holes 55' for receiving the at least one third grounding member 56 with an electrically conductive sharp or perforating/penetrating command 57. The second body 51 with the second wedge house 51 may be a casted or welded or machined construction.

Preferably the at least one integrated clip part 55 equals a counterpart for a rope U-clip, and the at least one third grounding member 56 with an electrically conductive sharp or perforating command 57 comprises an electrically conductive U-clip U-part equipped with threads for at least one securing nut, and with a sharp or perforating command 57. The third grounding member 56 enables a controlled depth adjustment of the perforating command, and also easy releasing of the rope 4 from the wedge housing 52.

According a second example of the second embodiment, the second body 51 comprises at least one integrated rope clip counterpart 55 for receiving the rope clip U-part, and acting as the at least one third grounding member with an electrically conductive sharp or perforating/penetrating command (not shown in the figures). The at least one third conductive grounding member is capable of penetrating the coating 42 of the rope 4 and establishing electrical contact between the cords of the rope core 41 and the body 51 of the rope terminal 50.

Thus, according to the second embodiment, either in the rope clip U-part 56 or counterpart 55 there is sharp at least one command or edge capable of perforating/penetrating the rope coating 42.

Generally, the elevator code is requiring having at least one rope clip under the wedge house 52. In the second embodiment the rope clip counterpart 55 may be integrated to wedge house and used for grounding rope to the body 51, so that there is no need for separate rope clips.

Preferably the grounding implemented according to the second embodiment is on free end side 4' of the rope 4 and the wedge 54 and wedge house 52. So not in suspension side for eliminating any critical damage in rope suspension cords.

Preferably the second body 51 with the second wedge house 52 is extended so that the rope clip 56 under the wedge 54 is tightened against the extension 51' of the body 51. In this case grounding can take place directly through electrically conductive contact between the body 51, and via the rod 53, the spring 53" and the rope terminal fixing. But if there is insulation (e.g. a damping bushing) between the connecting rod 53 and the rope terminal fixing, the grounding can be made optionally by using a cable shoe 60 under the rope clip fixing nut 58.

Figure 6:
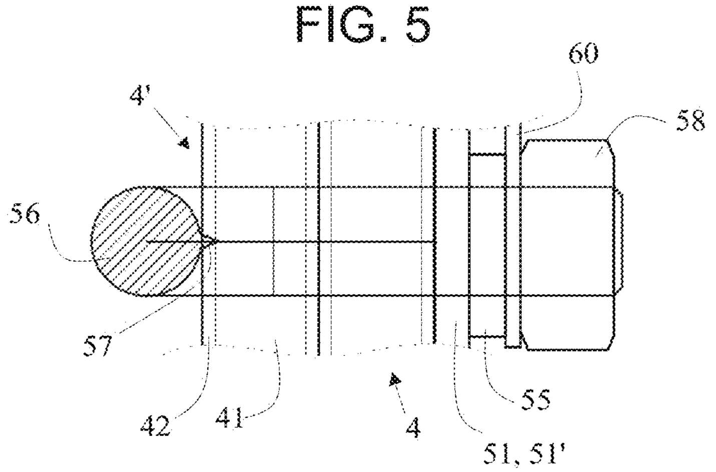
FIG. 6 shows a cross-sectional side view of the assembled second grounding member penetrating the rope coating.
Figure 7:
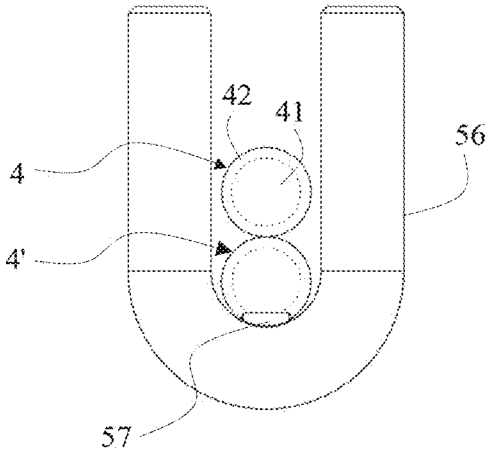
FIG. 7 shows a top view of a perforating U-clip of the second grounding member.

FIGS. 6 and 7 show in greater detail the second grounding member 56 penetrating the rope coating 42 and establishing electrically conductive contact between the cords of the rope core 41 and the body 51 of the rope terminal 50. FIG. 7 shows a top view of an example perforating rope U-clip part.

The use of the invention is not limited to the embodiments disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The elevator car guide rails could be positioned on opposite side walls of the shaft or on a back wall of the shaft.

It will be obvious to a person skilled in the art that, as the technology advances, the inventive concept can be implemented in various ways. The invention and its embodiments are not limited to the examples described above but may vary within the scope of the claims.

The invention claimed is:

1. A rope terminal for supporting an elevator suspension rope comprising:

a body of electrically conductive material, the body comprising a wedge housing;

a connecting rod of the electrically conductive material, the connecting rod being fixed to the body and being configured to mechanically connect the rope terminal to a rope terminal fixing member in a machine room or in a shaft;

a wedge configured to be insertable in the wedge housing with the elevator suspension rope wound around the wedge, wherein the rope terminal comprises at least one first grounding member configured to create an electrically conductive connection between the body of the rope terminal and an electrically conductive core of the elevator suspension rope, and the elevator suspension rope has an electrically insulating coating, and the at least one first grounding member comprises at least one integrated electrically conductive rope clip counterpart including a first electrically conductive sharp or perforating command configured to penetrate through the electrically insulating coating to the electrically conductive core of the elevator suspension rope.

2. The rope terminal according to claim 1, wherein the at least one first grounding member is integrated in the body of the rope terminal.

3. The rope terminal according to claim 1, comprising at least one second grounding member including a second electrically conductive sharp shape or tip inside the body, the second electrically conductive sharp shape or tip configured to perforate the electrically insulating coating of the elevator suspension rope wound around the wedge inserted into the wedge housing.

4. An elevator comprising:

a car;

hoisting machinery with a motor and a traction sheave;

one or more suspension ropes; and a counterweight, wherein the car and the counterweight are suspended by the one or more suspension ropes guided over the traction sheave to move the car vertically in the shaft, and at least one suspension rope from among the one or more suspension ropes is the elevator suspension rope of claim 1, supported by the rope terminal.

5. A method for installing the elevator suspension rope having the electrically insulating coating, the method comprising:

mounting the elevator suspension rope within the rope terminal of claim 1; and moving the at least one first grounding member against the elevator suspension rope to penetrate the electrically insulating coating and create the electrically conductive connection between the body of the rope terminal and the electrically conductive core of the elevator suspension rope.

6. The method according to claim 5, wherein the electrically conductive connection is created by moving the first electrically conductive sharp or perforating command of the at least one first grounding member to penetrate the electrically insulating coating of the elevator suspension rope.

7. The method according to claim 5, comprising:

winding the elevator suspension rope around the wedge, the wedge including at least one second grounding member; and moving the elevator suspension rope with the wedge in the wedge housing against the at least one second grounding member, the at least one second grounding member being in an inner wall of the body of the rope terminal, to penetrate the electrically insulating coating of the elevator suspension rope.

8. The method according to claim 5, comprising tightening a rope clip integrated with the body of the rope terminal, the rope clip comprising a second electrically conductive sharp or perforating command that penetrates through the electrically insulating coating to the electrically conductive core of the elevator suspension rope.

9. A rope terminal for supporting an elevator suspension rope comprising:

a body of electrically conductive material, the body comprising a wedge housing;

a connecting rod of the electrically conductive material, the connecting rod being fixed to the body and being configured to mechanically connect the rope terminal to a rope terminal fixing member in a machine room or in a shaft;

a wedge configured to be insertable in the wedge housing with the elevator suspension rope wound around the wedge, wherein the rope terminal comprises at least one grounding member configured to create an electrically conductive connection between the body of the rope terminal and an electrically conductive core of the elevator suspension rope, and the elevator suspension rope has an electrically insulating coating, the at least one grounding member comprises at least one first grounding member including an electrically conductive sharp or perforating command configured to penetrate through the electrically insulating coating to the electrically conductive core of the elevator suspension rope, and the wedge housing comprises at least one opening, and the at least one first grounding member is configured to be insertable through the at least one opening.

10. The rope terminal according to claim 9, wherein the at least one opening is a threaded hole, and the at least one first grounding member is an electrically conductive screw component.

11. The rope terminal according to claim 9, wherein the at least one grounding member comprises at least one second grounding member comprising a rope clip integrated in the body of the rope terminal.

12. The rope terminal according to claim 11, wherein the body of the rope terminal comprises at least one integrated electrically conductive rope clip counterpart with holes, and the holes are configured to receive the at least one second grounding member.

13. A rope terminal for supporting an elevator suspension rope comprising:

a body of electrically conductive material, the body comprising a wedge housing;

a connecting rod of the electrically conductive material, the connecting rod being fixed to the body and being configured to mechanically connect the rope terminal to a rope terminal fixing member in a machine room or in a shaft;

a wedge configured to be insertable in the wedge housing with the elevator suspension rope wound around the wedge, wherein the rope terminal comprises at least one grounding member configured to create an electrically conductive connection between the body of the rope terminal and an electrically conductive core of the elevator suspension rope, and the elevator suspension rope has an electrically insulating coating, and the at least one grounding member comprises a U-part of an electrically conductive rope clip, and the U-part comprises a sharp or perforating command configured to penetrate through the electrically insulating coating to the electrically conductive core of the elevator suspension rope.

* * * * *